Patented Apr. 3, 1923.

1,450,463

UNITED STATES PATENT OFFICE.

ALFRED THAUSS, OF DENTZ, NEAR COLOGNE, AND ALFRED GÜNTHER, OF COLOGNE, GERMANY, ASSIGNORS TO FARBENFABRIKEN VORM. FRIEDR. BAYER AND CO. IN LEVERKUSEN, NEAR COLOGNE-ON-THE-RHINE, GERMANY.

SULPHURIZED COMPOUND OF PHENOLS. REISSUED

No Drawing. Application filed August 8, 1921. Serial No. 490,747.

*To all whom it may concern:*

Be it known that we, ALFRED THAUSS and ALFRED GÜNTHER, citizens of Germany, residing at, respectively, Dentz, near Cologne, and Cologne, Germany, have invented new and useful Improvements in Sulphurized Compounds of Phenols, of which the following is a specification.

This invention relates to the manufacture of new mordants. They consist of new sulphurized compounds of phenol, its homologues and its substitution products, such as cresols, chlorphenols, and the like and are obtained by heating phenol or its homologues or substitution products with aqueous caustic alkali and sulfur, in practice in quantities larger than the molecular proportions. The new sulfur derivatives are easily absorbed by undyed cotton fibre and act as mordants for basic colors. The dyeings thus obtained are faster to washing and to light than those produced on tannin. The new compounds are generally yellowish powders.

The invention is illustrated by the following example, the parts being by weight:—
26 parts of orthochlorphenol are dissolved in 20 parts of hot water and 8.5 parts of sodium hydroxid. On the addition of 10 parts of sulfur this solution is heated to boiling in a vessel provided with a reflux condenser. The resinous reaction product thus produced is separated from the aqueous liquor, dissolved in 15 parts of sodium carbonate and 200 parts of hot water, and finally salted out with sodium sulfate. The greenish paste thus obtained is dried by heating in vacuo until after cooling a test turns solid and pulverulent. The sodium salt is soluble in cold and easily soluble in warm water.

Analogous compounds are obtained when ortho-chlorphenol is replaced by the para-product, the phenol itself, the cresols, the di- or polychlor- or the corresponding bromphenols.

For dyeing purposes the product prepared according to the above example from ortho-chlorphenol is dissolved, for example, in sodium carbonate solution.

Cotton is mordanted with 5 per cent of this product (weight of the dry substance) at 70° C. for half an hour with the addition of 50 per cent of common salt. After wringing well, rinse and dye with the basic colors in the usual manner.

The compounds obtained from the homologues and substitution products of phenol are prepared and fixed on cotton in the same manner as above mentioned.

Yarns are with advantage treated in the same way, the material remaining being left in the bath to cool down over night.

It is remarkable that basic dyestuffs, such as rhodamin B extra, methylviolet B, auramin O and others possess after this process of fixing the same shades as those produced by the tannin method.

The new mordants may be added to a dye bath containing a substantive cotton dyestuff and a sulfur dyestuff the dyeing being aftertreated with a basic dyestuff. The colors hereby obtained are better fixed or more intense than those topped according to methods hitherto known.

We claim:—

1. The herein-described new sulphurized compounds of phenols which are obtainable by boiling phenols with aqueous caustic alkali and sulfur; which compounds are generally yellowish powders being mordants for fixing basic dyes on cotton, substantially as described.

2. The herein-described new sulphurized compound of ortho-chlorphenol which is obtainable by heating ortho-chlorphenol with aqueous caustic alkali and sulfur; which compound is a yellowish powder being a mordant for fixing basic dyes on cotton, substantially as described.

In testimony whereof we have hereunto set our hands in the presence of two subscribing witnesses.

ALFRED THAUSS. [L. S.]
ALFRED GÜNTHER. [L. S.]

Witnesses:
HANS BRÜCKNER,
MATTHIAS LABBEUS.